Figure 1:
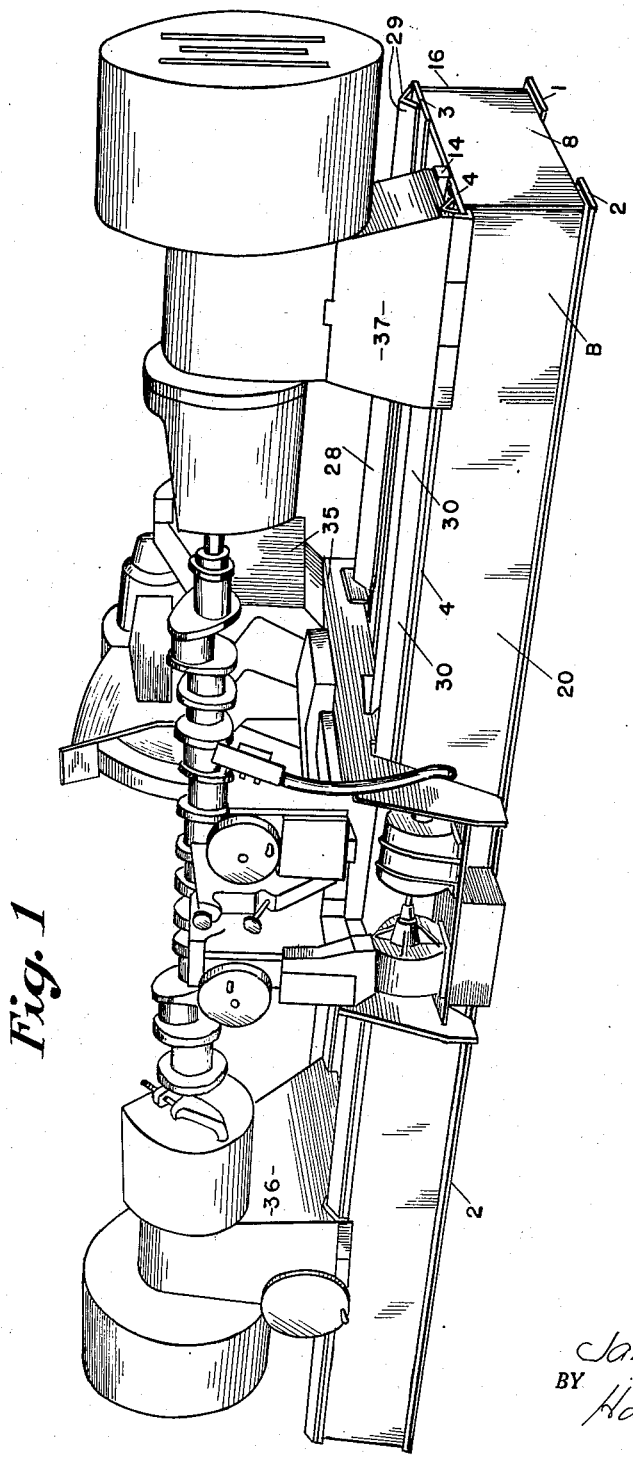

July 13, 1954

J. J. STRNAD 2,683,335

MACHINE TOOL BASE

Filed Aug. 7, 1951

9 Sheets-Sheet 1

INVENTOR.
James J. Strnad
BY
Harry P. Canfield
Attorney

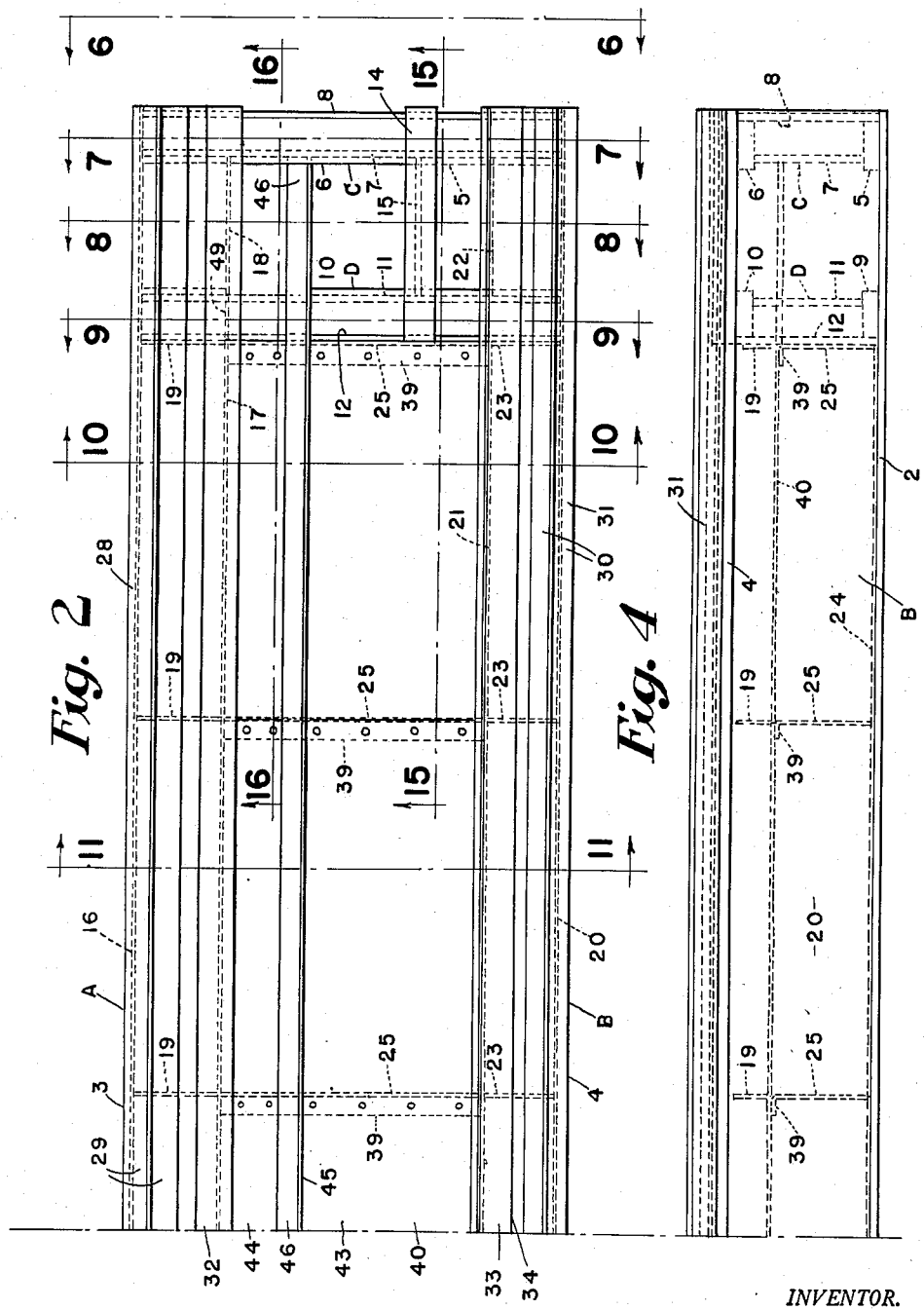

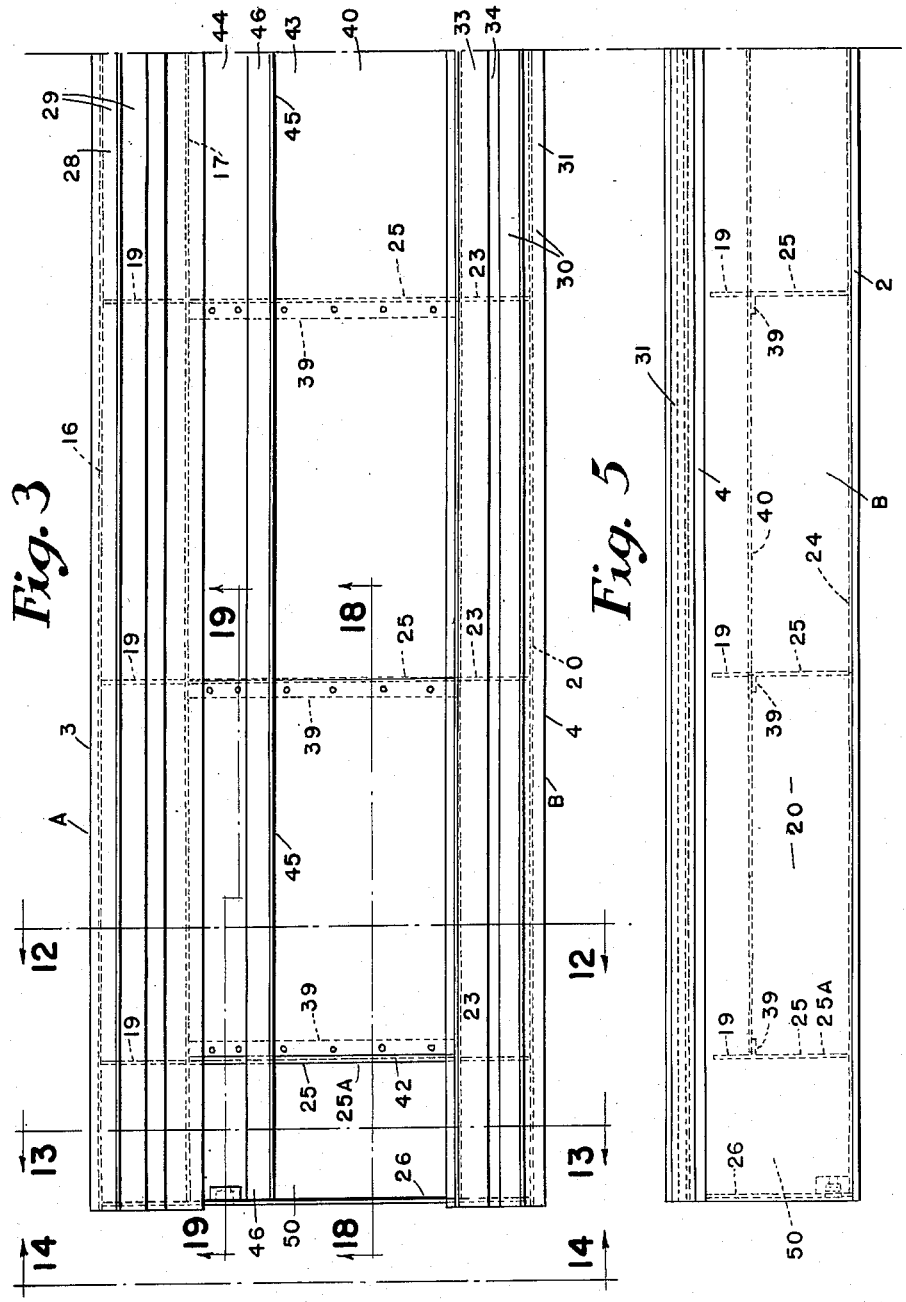

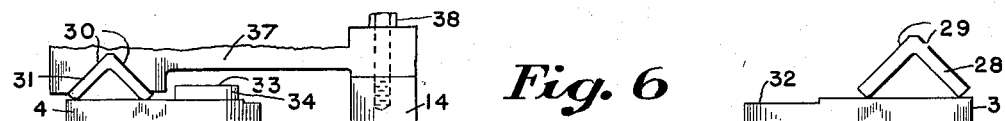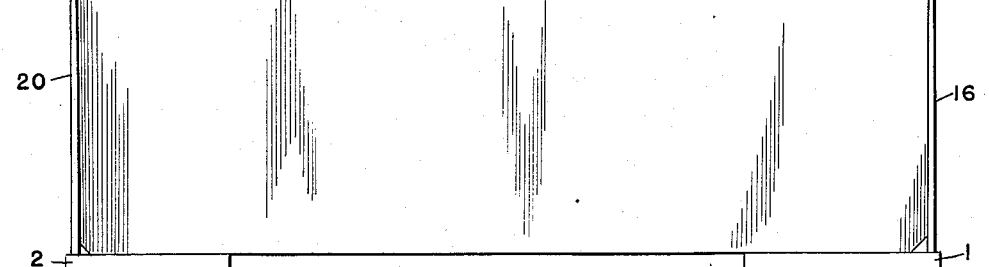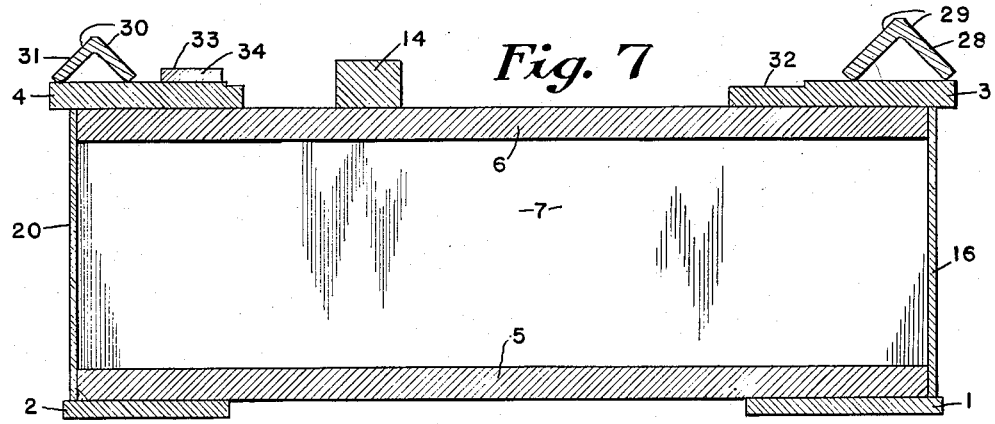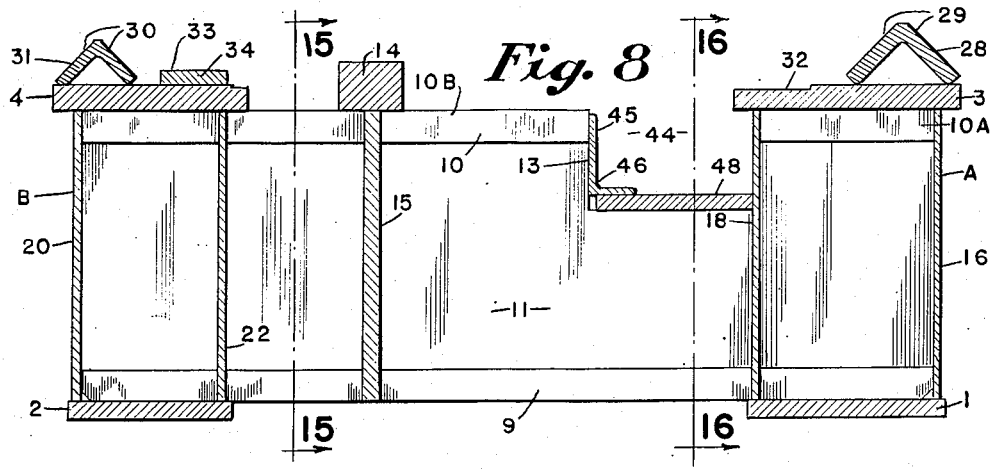

July 13, 1954
J. J. STRNAD
2,683,335
MACHINE TOOL BASE
Filed Aug. 7, 1951
9 Sheets-Sheet 5
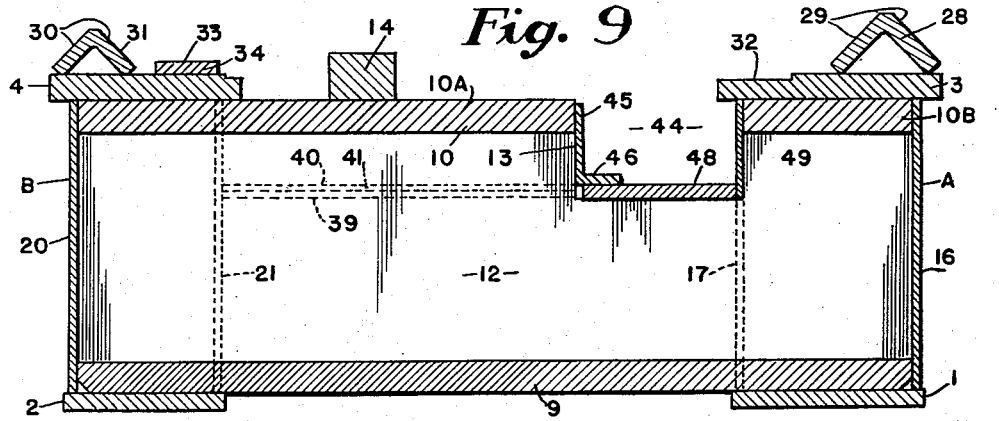
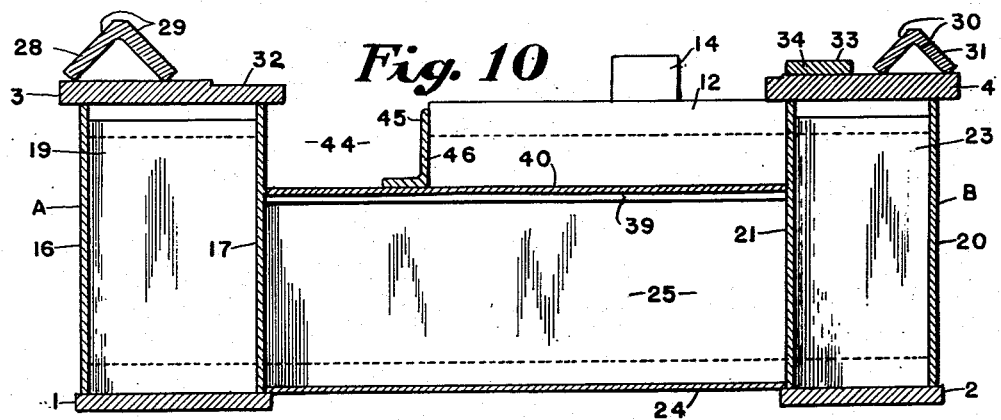
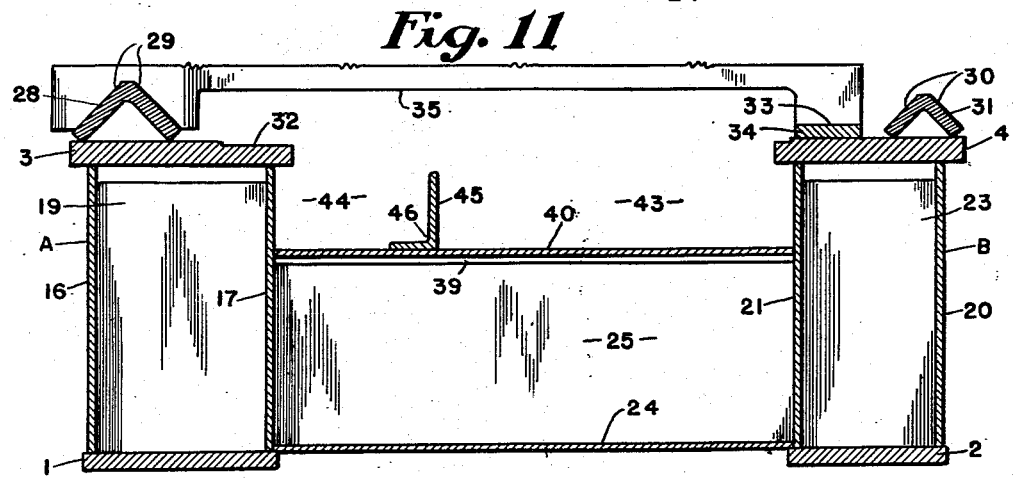
INVENTOR.
James J. Strnad
BY Harry P. Canfield
attorney July 13, 1954  J. J. STRNAD  2,683,335
MACHINE TOOL BASE Filed Aug. 7, 1951 9 Sheets-Sheet 6

INVENTOR.
BY James J. Strnad
Harry P. Canfield
Attorney

INVENTOR.
BY James J. Strnad
Harry P. Canfield
attorney

July 13, 1954  J. J. STRNAD  2,683,335
MACHINE TOOL BASE
Filed Aug. 7, 1951　　　　　　　　　　　　　　　9 Sheets-Sheet 9

INVENTOR.
BY James J. Strnad
Harry R. Canfield
attorney

Patented July 13, 1954

2,683,335

UNITED STATES PATENT OFFICE 2,683,335

MACHINE TOOL BASE

James J. Strnad, Shaker Heights, Ohio, assignor to Lempco Products, Inc., Bedford, Ohio, a corporation of Ohio Application August 7, 1951, Serial No. 240,733

8 Claims. (Cl. 51—166)

This invention relates to supporting bases for machine tools.

There is a general class of machine tools comprising a tail stock, and head stock and a tool head, all supported on a common base and movable on ways on the base to variably position them therealong relative to each other; and the present invention relates in general to bases for machine tools of this class; particularly machine tools of large size.

Typical of such machine tools are crank shaft grinders in which a crank shaft is rotatably supported on and between the head stock and tail stock and the tool is a rotary grinding wheel on a grinding wheel head therebetween.

The head and tail stocks are relatively movable, one toward and from the other on ways provided on the base to accommodate crank shafts of different lengths. The grinding wheel head is movable on ways on the base to different positions along the crank shaft and may be fed longitudinally at each position to grind the several journals of the crank shaft.

In some cases, the crank shaft is of great weight, diesel engine crank shafts for example; and the head and tail stocks and the grinding wheel head are correspondingly of large size and great weight.

The base is therefore subjected to strains tending to bend and otherwise distort it, due to the weight of the said parts thereon and to their being variably positioned longitudinally of the base.

It is sometimes desirable to design the machine so that the weight of some of the supported parts, say the grinding wheel head, is supported largely on ways at one side of the base and the weight of other parts, say the tail stock or head stock, is largely supported on ways on the other side; and it is common practice to support the base as a whole on wedge devices, at spaced points longitudinally on a floor, in order to be able to level up the ways; and these requirements add still further to the twisting and bending strains imposed on the base.

Such machines are required to perform highly accurate operations on the work; and it is therefore essential that the parts be maintained in accurate relative positions and alignment, and to this end the base must be rigid to resist said strains without distortion.

The common practice is to attain this rigidity by making the base from cast iron. This is objectionable because of the great weight of the base casting itself, necessary for rigidity; and because of the consequent high cost thereof.

According to the present invention, the base is made by fabricating it from steel parts, welded together, utilizing plates, bars and rolled steel sections, of standard commercial dimensions; and rigidity is attained by disposing the steel parts in a novel manner so that strains are communicated to them in the directions of the greatest strength of the parts, whereby the amount and weight of material for a high degree of rigidity, is reduced to the minimum, at a correspondingly reduced cost compared with cast iron.

Such machine tools, in many instances, are provided with means for directing a stream of liquid upon the tool and work for cooling or lubricating purposes; and in such cases the base is provided with a liquid reservoir from which the liquid is pumped and to which it is returned.

When, as in prior practice, the base is made from cast metal, the provision of walls for the reservoir add to the complications of the casting and its pattern; and the walls must be thick to cast properly; and this adds unduly to the weight and cost.

The base of the present invention has a liquid reservoir, fabricated from sheet metal; and the metal of the reservoir is disposed so that it contributes to the strain resisting rigidity of the base; so that the provision of metal for the reservoir itself adds little to the base material.

The reservoir is constructed of trough form extending longitudinally of the base in two parallel parts connected at one end whereby in all positions of the tool head longitudinally of the base liquid may be picked up by a pump directly from one part and discharged back into the other part, and thus made to flow continuously from one part to the other at their connected ends; and a sump is provided at their connected ends constructed so that grinding dust and other solid material separates out and into the sump by gravity.

Because the material of the reservoir trough itself contributes to rigidity as aforesaid, the double trough is advantageously made to extend the full length of the base, and longer than is operatively necessary. This has the advantage that due to the large volumetric capacity of the reservoir and the large volume of liquid circulating through it, as aforesaid, the flow of liquid occurs at a low rate of flow, and the solid matter in the liquid therefore readily settles and precipitates out into the sump.

While it is economically advantageous to reduce the amount of material in the base by utilizing steel parts disposed according to engineering principles to effect the maximum of rigidity for the minimum of material, as aforesaid, there is at the same time a minimum of actual weight which must be retained in the base as a whole for general stability.

By extending the liquid reservoir the full length of the base, longer than operatively necessary as aforesaid, the weight of the liquid in it provides at no cost, a considerable portion of the necessary weight, and economy is thus effected in that no provision need be made in the steel parts for this portion of the necessary minimum weight.

It is among the objects of the invention:

To provide generally an improved machine tool base fabricated from steel parts in an improved manner;

To provide the maximum of rigidity with the minimum of material;

To provide an improved machine tool base in which objections to prior bases some of which are mentioned hereinbefore, are obviated;

To provide a machine tool base having an improved circulating liquid reservoir therein;

To provide a machine tool base having a liquid reservoir operating in an improved manner.

With these objects in view, and others that will occur to those skilled in the art to which the invention appertains, the invention comprises a machine tool base having, among others, the features hereinbefore recited, described in detail for a preferred embodiment of the invention in the following description taken in connection with the accompanying drawing in which:

Fig. 1 is a perspective view of a machine tool base embodying the invention and showing a crank shaft grinding machine as one illustrative example of machine tools to support which the base is adapted.

Figure 14:
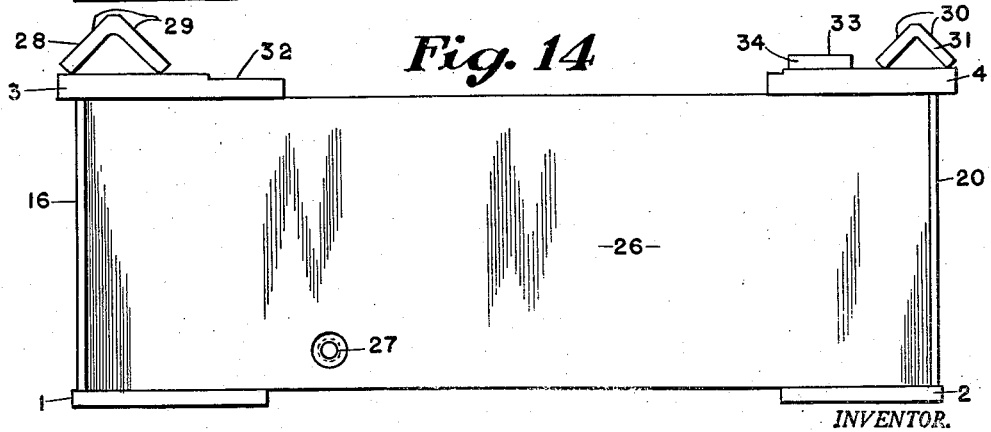
Figure 15:
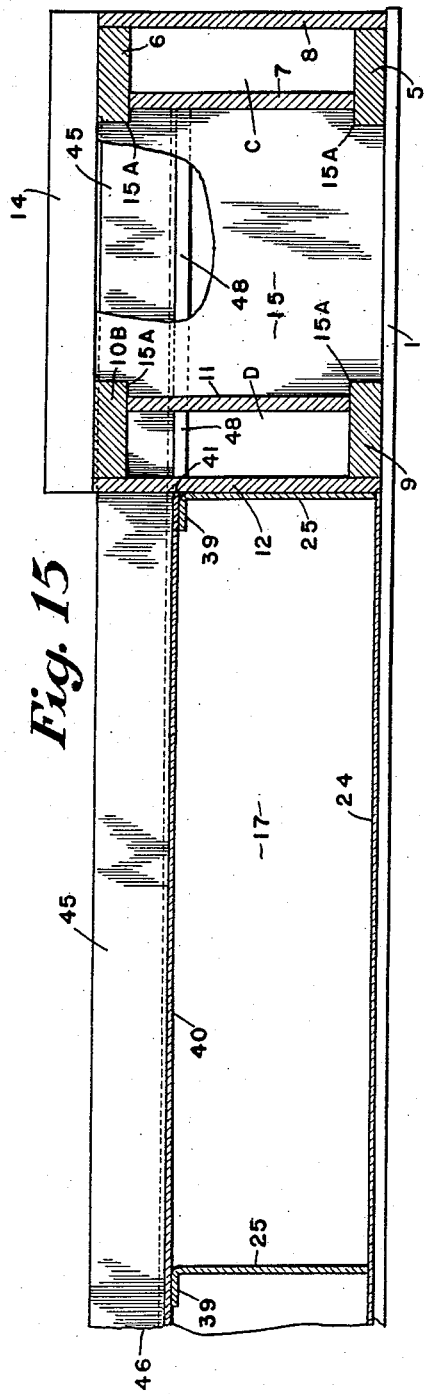
Figure 16:
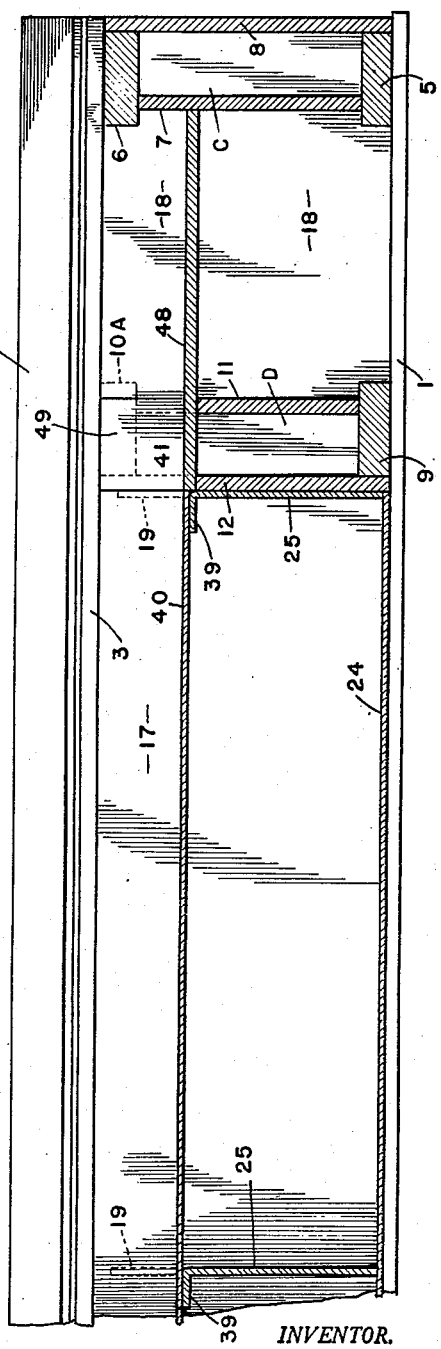
Figure 17:
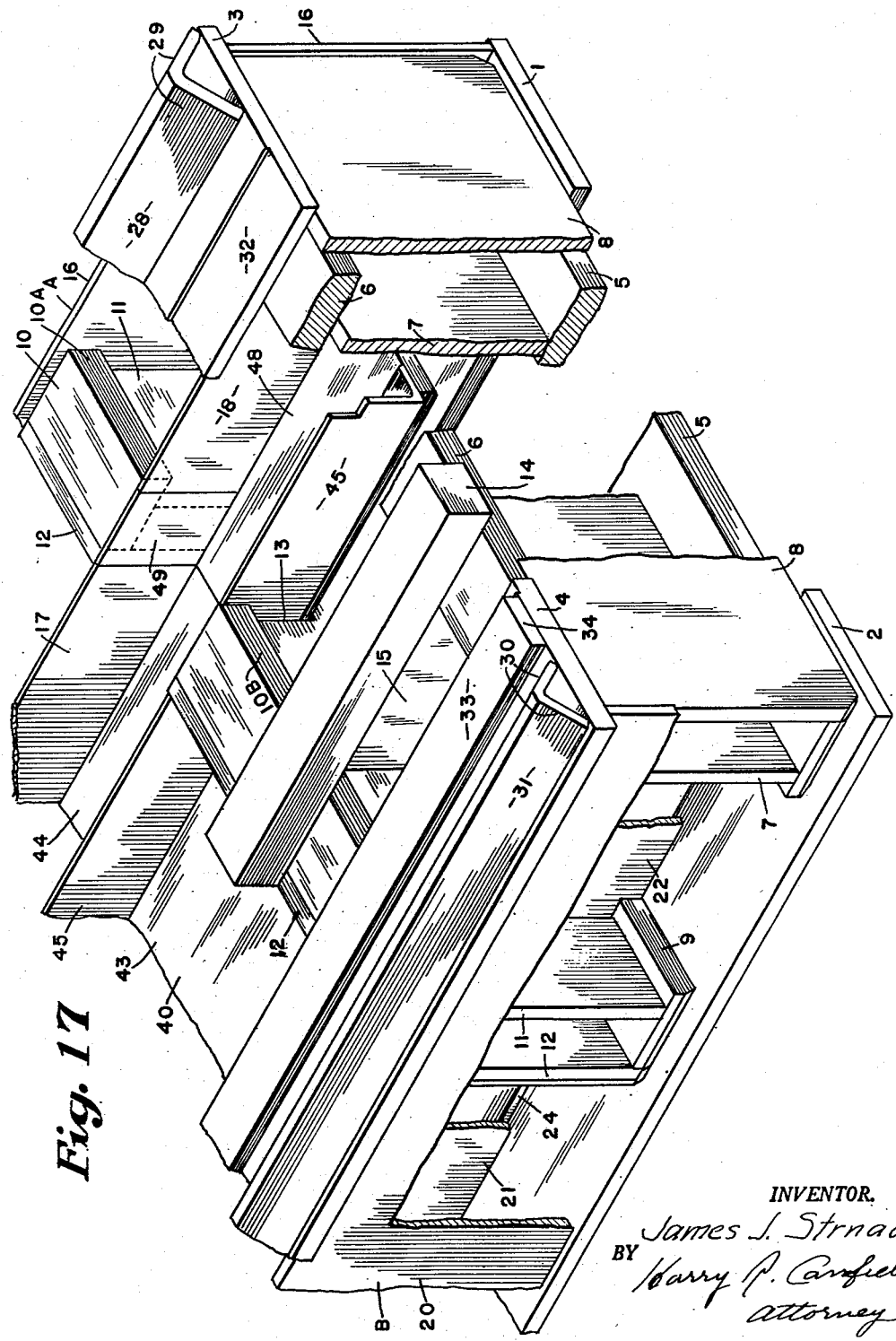

Figs. 2 and 3 taken together are a top plan view of the base of Fig. 1; drawn to a larger scale;

Figs. 4 and 5 taken together are a front elevational view of the base of Figs. 2 and 3;

Fig. 6 is an end elevational view taken from the plane 6—6 of Fig. 2; to enlarged scale;

Figs. 7, 8, 9, 10, 11, 12 and 13 are sectional views taken respectively from the planes 7—7, 8—8, 9—9, 10—10, 11—11, 12—12, and 13—13 of Figs. 2 and 3 to enlarged scale;

Fig. 14 is an end elevational view taken from the plane 14—14 of Fig. 3 to enlarged scale;

Figs. 15, 16, 19 and 18 are fragmentary sectional views taken respectively from the planes 15—15, 16—16, 19—19 and 18—18 of Figs. 2 and 3 to enlarged scale; and Figs. 16 and 15 may also be referred to the section planes 15—15 and 16—16 of Fig. 8;

Fig. 17 is a perspective view to larger scale than the other figures of the right hand end of the base (as viewed in Fig. 1) with parts broken away and parts in section to further illustrate certain features of the construction.

In order that certain structural and operative features of the machine base embodying the invention may be concretely presented, the base has been illustrated in Fig. 1 as the base of a crank-shaft grinding machine as one of the most important uses thereof; but as will appear, it may be used as the base of other kinds of machine tools.

For convenience of description herein the base will be referred to as in the position of Fig. 1, that is, extending longitudinally from left to right.

Referring to the drawings at 1 and 2 are transversely spaced, foot plates of thick bar steel, extending longitudinally the full length of the base. These foot plates support the whole base on a floor, and adjustable wedge devices not shown but of well known construction are to be disposed between the foot plates and the floor at longitudinally spaced points and adjusted to level up the base.

Directly above the foot plates 1 and 2 are top plates 3 and 4 of thick bar steel also extending the full length of the base.

The top plates 3 and 4 have longitudinal machine ways thereon, respectively, to be described, and upon which the main parts of a machine tool and the weight thereof are supported; and as a primary feature of the base construction the top plates are rigidly supported by the foot plates, in predetermined vertical relation thereto and in predetermined transverse spaced relation to each other; and the foot plates and top plates are rendered rigid against bending or twisting or being otherwise distorted by hollow box type beam constructions extending longitudinally along opposite sides of the base, identified as A and B and a pair of box-like transverse constructions at the right end of the base, identified as C and D the latter serving also special purposes to be described.

The transverse box like structure C at the extreme right end of the base, Figs. 2, 4, 7, 15 and 16 comprises a thick lower steel bar 5 supported at its opposite ends upon the foot plates 1—2 and spanning them, and constituting the bottom of box C.

An upper bar 6 directly above the bar 5 and constituting the top of the box C, is supported on the lower bar 5 by a vertical plate 7 between the bars, and coextensive therewith transversely of the base.

A vertical plate 8 rests on the right ends of the longitudinal foot plates 1—2 and bridges them. The longitudinal top plates 3—4 rest at their right ends on the upper bar 6 and upper edge of the plate 8 and are supported thereby. The plates 7 and 8 constitute the side walls of the box C; and the plate 8 is also the right end wall of the base as a whole.

The box structure D, see Figs. 2, 4, 8, 9, 15, 10 spaced toward the left from the box C, is generally similar thereto, but differs in details.

The box D comprises a lower bar 9 lying on and bridging the foot plates 1—2 like the lower bar 5 of the box C; and comprises an upper bar indicated generally at 10 (corresponding to the bar 6 of the box C) connected to and supported from the lower bar 9, by box side plates 11 and 12 (corresponding respectively to the side plates 7 and 8 of the box C); but the bar 10 and the upper edge of the side plates 11 and 12 have an upwardly open rectangular recess or notch therein, indicated generally at 13, to accommodate a portion of a liqud reservoir to be described, so that the upper bar 10 of the box D is in two aligned parts 10A and 10B supported by the vertical side plates 11 and 12.

The longitudinal top plates 3—4 rest upon the upper bar 10 and side plate 12 of the box D as further support therefor.

When the base is used as the base of a crankshaft grinding machine with its parts arranged as in Fig. 1, a special purpose bolster 14 is provided see Figs. 2, 4, 7, 8, 9, 10, 15 resting at its ends upon and bridging the upper bars 6 and 10; and a web 15 amplifying the rigidity of the boxes C and D is provided, extending between the under side of the bolster 14, to the lower box bars 5 and 9 and notched at 15A—15A, to fit around the mutually confronting edges of the four bars 5—6—9—10 and extending to and between the vertical side plates 7 and 11 of the boxes C and D.

As to the longitudinal box constructions A and B, Figs. 2–3, 4–5, 10, 11, 12, 13, the box A has a vertical outer side wall 16 between the top and foot plates 3 and 1 adjacent to their outer edges and extending the full length of the base and to the right end wall 8 of the base and constitutes an outer side wall of the base.

An inner vertical wall 17 between the top and foot plates 3 and 1 extends from the left end of the base to the aforesaid vertical wall 12 of the box D, and, in alignment therewith, is at 18 a continuation thereof beyond the said box D and between the walls 7 and 11 of the boxes C and D respectively.

A series of partition walls 19—19 are provided within the box A, joining the walls 16 and 17 and the foot plate 3 and extending upward into close proximity to the top plate 3; six such partition walls being indicated in Figs. 2–3.

The construction of the box B is similar to that of the box A and comprises a vertical outer wall 20 constituting the side wall of the base as a whole, and extending the full length of the top plate 4 and foot plate 2 and to the right end wall 8 of the base; and comprises an inner vertical wall 21 between the foot and top plates 2—4 extending from the left end of the base to the aforesaid wall 12 of the box D, and having an aligned continuation 22 between the vertical walls 11 and 7 of the boxes D and C.

A series of six partition walls 23—23 are provided joining the foot plate 2 and the side walls 20—21 corresponding to the partition walls 19 of the box A.

The foot plate 1, top plate 3, and the spaced apart distance of the walls 16—17 of the box A may, in some cases, be wider transversely of the base than the foot plate 2 and top plate 4 and the distance apart of walls 20—21 of the box B as illustrated, in accordance with the respective loads and strains borne thereby, as for example in the illustrated use of the base for a crank-shaft grinder as in Fig. 1.

A base bottom wall 24 resting upon the foot plates 1—2 and abutting at its side edges against the inner box walls 17 and 21, extends from the left end of the base to the vertical wall 12 of the box D.

Transversely aligned with the partition walls 19 and 23 of the boxes A and B are vertical connecting walls 25—25 joined to the inner side walls 17 and 21 of the boxes A and B and to the bottom wall 24; these connecting walls together with the bottom wall 24, space the boxes A and B transversely.

The tops of the connecting walls 25—25 are considerably below the level of the top plates 3—4 to leave room above the connecting walls for a liquid reservoir to be described.

At the left end of the base an end wall 26 is provided upon which abut the ends of the box walls 16, 17 and 20, 21 and bottom wall 24, and which at its top and bottom edges abuts upon the top plates 3—4 and foot plates 1—2. This end wall 26 constitutes an outer end wall of the base as a whole but also constitutes the end wall of the said reservoir to be described, and to this end is provided with a drain plug receptacle 27 therethrough.

The top plates 3—4 besides constituting parts of the said box-like beam structures A and B are supports for parallel rectilinear longitudinal machine ways as follows.

A length of standard rolled angle-section steel 28 having equal length legs or flanges has the flanges resting upon the top plate 1 near its outer edge as shown in Figs. 2–3–4–5, and 6 to 14, and is welded thereto.

The outer faces of the flanges preferably having an included dihedral angle of 90°, constitute a way 29—29, V-shape in section, extending the full length of the base.

A similar V-shaped way 30—30 is provided on the opposite side of the base by a length of angle-section steel 31, and in the illustrated use of Fig. 1 is of smaller cross-sectional area than that of the angle 28; and it rests on the top plate 4 and is welded thereto and also extends the full length of the base.

The top plates 3 and 4 at portions thereof inwardly of the angles 28 and 31 are also provided respectively with planar horizontal ways 32—33, extending the full length of the base; the way 32 being provided by a surface on the top plate 3 itself, and the way 33 being provided by the upper surface of a bar 34 on top of the top plate 4.

Ways are thus provided in pairs on opposite sides of the base, one pair being the ways 29—33; and the other pair being 30—32; each pair of ways being adapted to support a machine part that reciprocates longitudinally of the base or that is to be adjustably positioned therealong longitudinally.

All four ways 29—33 and 30—32 may be accurately machined by mounting the base on the bed of a planer and machining the ways without changing the setting of the base in going from one way to the other. Thus the V-shaped ways 29 and 30 can be made accurately parallel to each other and the ways 32—33 can be made accurately in horizontal planes, and all of the ways made accurately to the correct distance above the foot plate supports 1—2, from end to end.

As indicated in Fig. 11, a machine part 35 may span and be supported on the two ways 29—33 but be guided longitudinally by the V-shaped way 29 alone, so that the horizontal way 33 compensates for any slight deviation from the preselected transverse dimension between the ways, that might occur due to the welding of the parts together.

Figure 12:
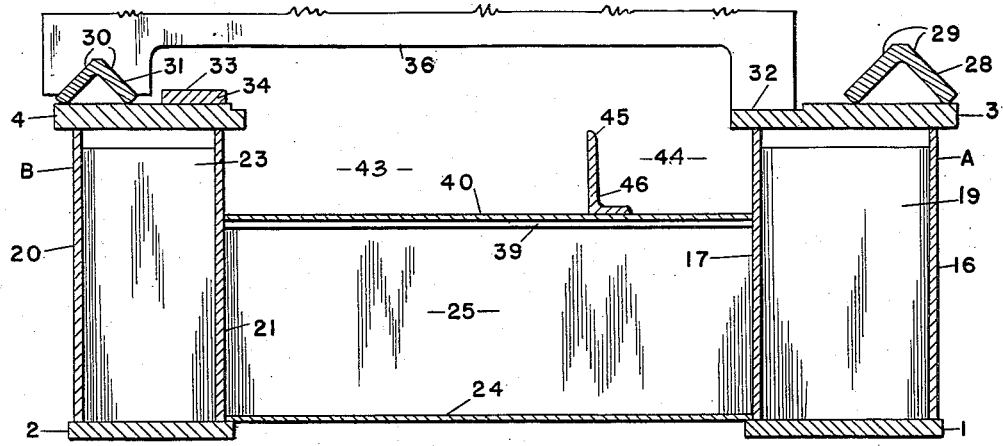
Figure 13:
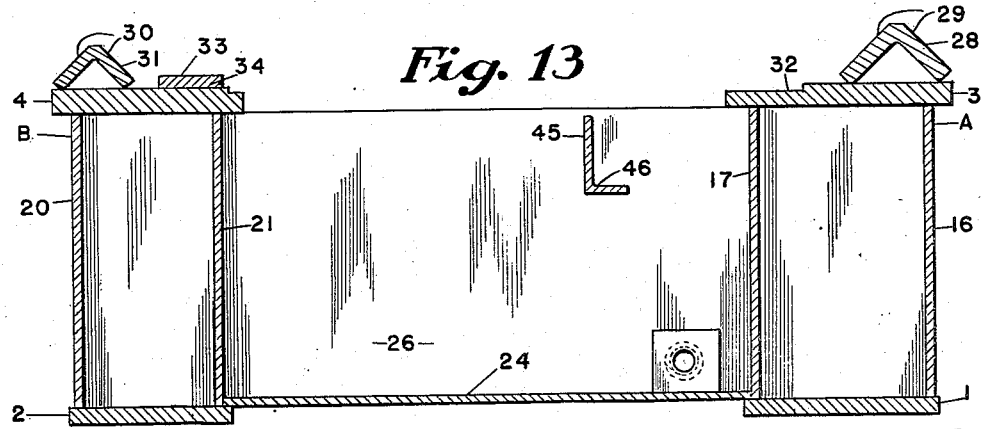

And as indicated in Fig. 12, a machine part 36 may span and be supported on the pair of ways 30—32 with the same advantages.

The base as thus far described is particularly well adapted to be the base of a crank shaft grinding machine and such a machine has been illustrated in Fig. 1 as applied to that use.

In such case, the aforesaid machine part 35 is the grinding wheel head 35 of Fig. 1; and the aforesaid machine part 36 is the head stock 36 of Fig. 1. The tail stock 37 of Fig. 1 is supported at its outer side, and aligned with the head stock 36 by being seated on the way 30, but its inner side is mounted and supported on the aforesaid bolster 14 as will be referred to.

From Fig. 1, considered with Figs. 11 and 12, it will be seen that only a portion of the ways 29 and 30 on the angles 28 and 31 are utilized as ways; but by continuing the ways the full length of the base and by making them of angle section they contribute largely to the rigidity of the base.

In a particular machine such as that of Fig. 1, there are design reasons why it is sometimes desirable to mount the tail stock largely at one side of the base, here the front side.

The rigidity of the boxes C and D may in such cases be advantageously utilized to rigidly support the tail stock in this asymmetrical position.

As indicated in Fig. 6 such a tail stock indicated at 37 rests at one side thereof upon, and is aligned and positioned by the ways 30—30 of, the steel angle 31, and at the other side rests upon the bolster 14 extending longitudinally of the base, and bolts 38 (one of which is shown in Fig. 6) going through a base portion of the tail stock 36 bolt it down upon the bolster 14. The bolster 14 is supported on the said C—D box structure as above described.

The aforesaid reservoir construction will now be described.

The said six vertical connecting walls 25—25 are bent over at their upper terminal edges to provide horizontal flanges 39—39 all in a common horizontal plane.

A longitudinal reservoir bottom 40 of sheet metal lies upon these flanges 39; and it extends toward the right to the vertical wall 12 of the said box D, abutting it as shown at 41, Fig. 15, and indicated at 41, Fig. 9; see also Figs. 10 and 16.

Figure 19:
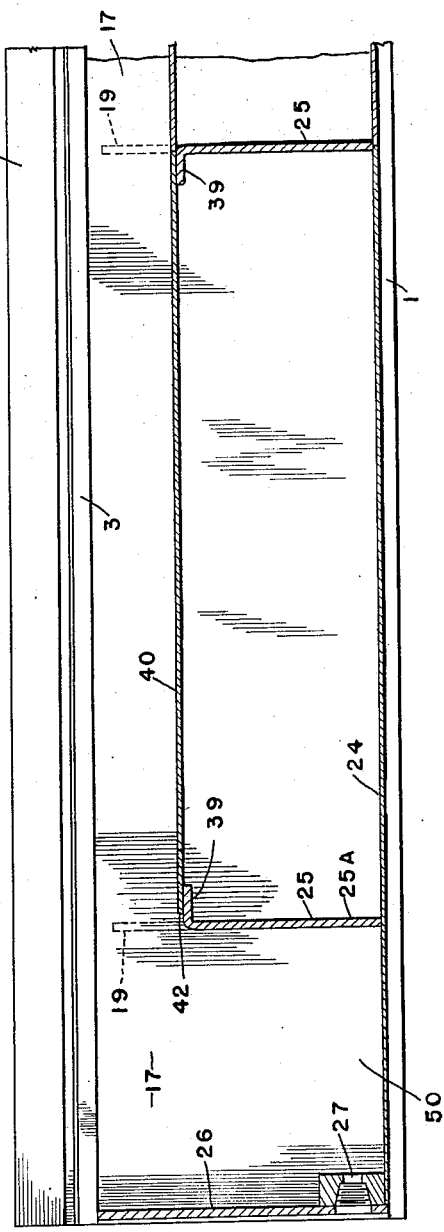

That one of the connecting walls 25 nearest the left end of the base, especially identified in Fig. 19 as 25A, is spaced as shown a considerable distance from the base end wall 26; and the left end of the bottom 40 of the reservoir resting on the flange 39 of the wall 25A, terminates thereat as at 42.

Transversely the reservoir bottom wall extends to and abuts upon the inner vertical walls 17 and 21 of the boxes A and B and is joined thereto, Figs. 10, 11 and 12.

The upper portions of the vertical walls 17 and 21 constitute the side walls of the reservoir, which as now appears, is in general in the form of an upwardly open trough.

The trough-form reservoir thus provided is divided longitudinally into two parallel side by side portions of unequal width, a wide portion 43 and a narrower portion 44, by the vertical flange 45 of a longitudinal steel angle 46, supported on the bottom 40; and therefore on the connecting walls 25—25. The narrower portion 44 is adjacent to the box A, as shown.

Figure 18:
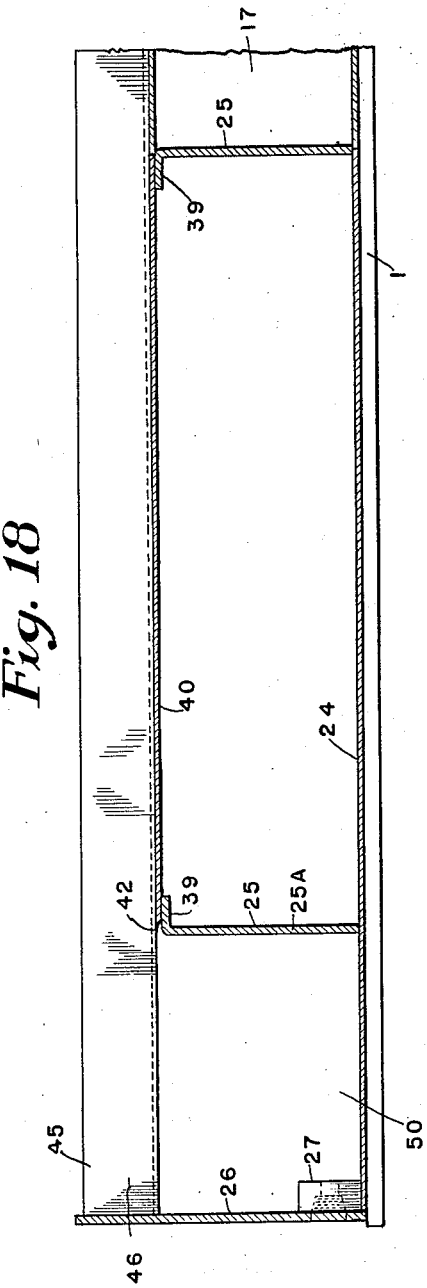

The left end of the longitudinal angle 46 extends to the base end wall 26 see Figs. 3 and 18, and the right end extends to the vertical wall 7 of box C, see Figs. 1 and 15.

At the right end of the trough, the wider portion 43 terminates at the vertical wall 12 of the transverse box D, effected by an abutting juncture of the trough bottom 40 with the wall 12 as shown at 41 see Figs. 15, 9, 10 and 2, the vertical box wall 12 thus constituting the right end wall of the wider trough portion 43.

The narrower trough portion 44 continues through and beyond the transverse box D to the box C by the following construction.

At the bottom of the aforesaid rectangular notch 13, the right end of the trough bottom 40 is continued through the notch to the vertical wall 7 of the box C by a bottom plate 48, Figs. 9 and 16, and indicated in Fig. 15.

A wall piece 49 connects the inner wall 17 of the box A with the aforesaid continuation wall 18 of the box wall, Figs. 9, 16 and 7, and constitutes the side wall of the narrow trough portion 44 after it goes through the notch 13.

The walls of the narrow trough portion 44 in the notch 13 thus provided are as follows. The bottom wall is the plate 48, one side wall is the angle leg 45, and the other side wall is the piece 49; and beyond the notch and toward the right, the walls are the same except that the continuation wall 18 takes the place of the piece 49. The narrow trough portion 44 thus extends continuously through the notch 13 to the vertical wall 7 of the box C.

When a machine is mounted on the ways described above, liquid may be picked up by a pump from one trough portion 43 or 44 and applied as referred to at the part of the machine operation, and drained back to the other trough portion, and will thus be circulated, toward the left in one trough portion and back toward the right in the other trough portion.

As shown in Figs. 3-5, 18 and 19, there is a space 50 between the left end connecting wall 25A and the left end wall 26 of the base, extending transversely under the longitudinal angle 46. Liquid in one portion of the reservoir flowing from out of its left end, must flow down into this space and under the angle 46 and up out of this space in order to enter the other trough portion.

The space 50 thus is a sump into which solid matter such as grinding dust is caused to settle and from which it may be removed from time to time in any suitable manner, or by flushing out through the drain plug receptacle 27.

Preferably, in practice, the liquid is pumped from the narrow trough portion 44 and returned to the wide portion 43 and thence flows to the sump 50, whereby the velocity of flow into the sump being by way of the wider trough portion, is reduced and depositing of solid matter in the sump is insured.

It is believed that it will be understood that adjacent parts of the structure above described where they abut or otherwise contact each other are to be welded together thereat; and that in view of the state of the art of welding steel parts together it is not necessary to identify and describe the welds; but that it will suffice to say that the parts are welded together into an integral one piece structure.

From the foregoing description as well as from the drawing it will be seen that the parts provide front and rear side walls, and end walls, that are planar and vertical, with foot plates or feet projecting slightly out from under them, which while primarily designed for rigidity and light weight, give the visual impression of great mass, solidity and stability.

As to the inherent force reactions provided within the structure that give it rigidity, the following may be noted.

The principal end to be attained is to support the machine tool ways 29, 30, 32, 33, without movement one relative to the other in any direction in space and to maintain each of them accurately rectilinear, without distortion by bending or twisting after they have once been machined on the finished base as described.

The ways are therefore made integral with box beams A and B; and the box beams are made both deep and wide, and therefore are each, individually, inherently rigid against bending or twisting, as is well known.

The rigid box beams A and B are connected together by rigid boxes C and D; and by spacing the boxes C and D a considerable distance apart longitudinally of the box beams A and B, the boxes C and D perform a number of functions.

They rigidly hold the box beams in transversely spaced relation; and also prevent the box beams from yieldingly converging or diverging horizontally one relative to the other; and also prevent portions of one box beam including portions remote from the boxes C and D from rising or falling relative to the other box beam; and prevent one box beam from shifting longitudinally relative to the other.

The transverse connecting walls 25, the bottom wall 24 and end wall 26 contribute additionally to the rigidity afforded by the box beams and end box construction.

When the machine parts to be supported on the base are such as are illustrated in Fig. 1, it has been found that two transverse box beams C and D will provide the necessary rigidity. In the case of machines of different construction more rigidity may be wanted and this may be provided by additional transverse box beams of the same general construction as the described pair of box beams C and D. The invention therefore is not limited to two transverse box beams.

In other respects also, the invention is not limited to the exact details illustrated and described herein, but is comprehensive of all changes and modifications thereof which may be made and which come within the scope of the appended claims.

I claim:

1. A machine tool base fabricated from steel parts welded together and comprising: a pair of elongated hollow rigid box beams constituting opposite side portions of the base, each comprising a lower foot plate, an upper top plate, and intermediate transversely spaced inner and outer side walls; the box beams being connected together and fixed in transversely spaced relation by a plurality of longitudinally spaced transversely extending connecting elements; parallel machine tool ways carried by the respective top plates; the connecting elements including a plurality of transverse box structures spaced longitudinally of the box beams, and each comprising spaced apart side walls and transversely extending top walls extending under the said upper top plates and upon which the top plates are supported, and comprising bottom walls, extending over the said lower foot plates and supported thereby.

2. A machine tool base fabricated from steel parts welded together and comprising: a pair of elongated hollow rigid box beams constituting opposite side portions of the base, each comprising a lower foot plate an upper top plate, and intermediate transversely spaced inner and outer side walls; the box beams being connected together and fixed in transversely spaced relation by a plurality of longitudinally spaced transversely extending connecting elements; parallel machine tool ways carried by the respective top plates; the connecting elements including a plurality of transverse box structures spaced longitudinally of the box beams, and each comprising spaced apart side walls and transversely extending top walls extending under the said upper top plates and upon which the top plates are supported, and comprising bottom walls extending over said lower foot plates and supported thereby, and the connecting elements including a bottom wall connecting the said bottom plates, and a plurality of connecting walls connecting the inner walls of the box beams.

3. A machine tool base fabricated from steel parts welded together and comprising: a pair of elongated hollow rigid box beams constituting opposite side portions of the base, each comprising a lower foot plate, an upper top plate, and intermediate transversely spaced inner and outer side walls; the box beams being connected together and fixed in transversely spaced relation by a plurality of longitudinally spaced transversely extending connecting elements; the top plates provided with longitudinal, rectilinear parallel, V-shaped, upwardly convex machine tool ways formed on angle section bars carried by the top plates; and the respective top plates provided with planar machine tool ways disposed in mutually parallel planes; the connecting elements including a plurality of transverse box structures spaced longitudinally of the box beams, and each comprising spaced apart side walls and transversely extending top walls extending under the said upper top plates and upon which the top plates are supported, and comprising bottom walls extending over the said foot plates and supported thereon.

4. A machine tool base fabricated from steel parts welded together and comprising a pair of longitudinally extending rigid beam structures at opposite sides of the base, fixed in transversely spaced relation by a plurality of longitudinally spaced transverse connecting parts; the beam structures comprising each a lower longitudinal foot plate for resting on a floor or the like, and an upper longitudinal top plate; longitudinal parallel machine tool ways provided on the top plates respectively; an upwardly open trough-form liquid reservoir extending longitudinally of the base, and between the beam structures and comprising a bottom wall below the ways; a longitudinal wall rising from the trough bottom, dividing the trough into two longitudinal trough portions; the two trough portions having end wall closures at one end; and at the other end terminating at and communicating with a common walled sump below the level of the bottom; and the dividing wall continuing over the sump beyond the termination of the trough portions.

5. A machine tool base fabricated from steel parts welded together and comprising: a pair of elongated rigid hollow box beams constituting opposite side portions of the base, each comprising a lower foot plate, an upper top plate, and intermediate transversely spaced inner and outer side walls; the box beams being connected together and fixed in transversely spaced relation by a plurality of longitudinally spaced transversely extending connecting elements; machine tool ways provided on the respective top plates; an end wall connecting the inner walls of the box beams at one end thereof; a liquid reservoir of upwardly open trough-form closed at one end and extending longitudinally of the base and between the box beams, and having a bottom wall supported by the connecting elements below the ways; the inner side walls of the box beams constituting the trough side walls; a sump at said other end of the trough deeper than the trough; the end wall and box beam inner side walls constituting walls of the sump, a longitudinal dividing wall rising from the trough bottom, dividing the trough into two longitudinal trough portions; the dividing wall extending over the sump to the end wall.

6. A machine tool base fabricated from steel parts welded together and comprising a pair of longitudinally extending rigid beam structures at opposite sides of the base, fixed in transversely spaced relation by a plurality of longitudinally spaced transverse connecting parts; the beam structures comprising each a lower longitudinal foot plate for resting on a floor or the like, and an upper longitudinal top plate; longitudinal